United States Patent [19]
Blanks

[11] Patent Number: 5,966,075
[45] Date of Patent: Oct. 12, 1999

[54] MOTION-SENSITIVE BIRD REPELLING DEVICE

[76] Inventor: Carthonia Blanks, 7706 S. Raci NE., Chicago, Ill. 60620

[21] Appl. No.: 09/037,568

[22] Filed: Mar. 10, 1998

[51] Int. Cl.⁶ .................................................. G08B 23/00
[52] U.S. Cl. ...................... 340/573.2; 119/719; 119/712; 340/573.1; 340/567; 340/384.2; 340/384.1; 340/392.2; 340/393.1; 600/21
[58] Field of Search ..................................... 119/719, 712; 340/573.1, 567, 384.2, 384.1, 392.2, 393.1; 600/21; 116/22 A

[56] References Cited

U.S. PATENT DOCUMENTS

| | | | |
|---|---|---|---|
| 2,788,762 | 4/1957 | Wright | 116/22 A |
| 3,056,376 | 10/1962 | Bender | 340/573.2 |
| 5,214,411 | 5/1993 | Herbruck | 340/573 |
| 5,224,438 | 7/1993 | Buss | 116/22 A |
| 5,257,012 | 10/1993 | Metcalf | 340/573 |
| 5,450,060 | 9/1995 | Parkhurst | 340/539 |
| 5,501,179 | 3/1996 | Cory | 119/712 |
| 5,602,523 | 2/1997 | Turchioe et al. | 340/384.2 |
| 5,627,518 | 5/1997 | Wishart | 340/567 |

*Primary Examiner*—Daniel J. Wu
*Assistant Examiner*—Tai Tan Nguyen
*Attorney, Agent, or Firm*—Goldstein & Canino

[57] ABSTRACT

A motion-sensitive bird repelling device comprises a cylindrical shaped housing, and a plurality of spike legs extending downwardly from the bottom thereof for securing the housing to a garden or lawn, for protecting newly planted seeds from being eaten by birds and rodents. The bird repelling device includes motion sensors for detecting motion of a bird or rodent entering a prohibited area. The motion sensors activate a motor in response to simultaneous detecting of the trespassing animal into such area. When the motor is activated, a plurality of flexible arms mounted to the motor rotates, producing both noise and fluttering motions for scaring the approaching animals prior to reaching the seeds.

1 Claim, 3 Drawing Sheets

MOTION-SENSITIVE BIRD REPELLING DEVICE

BACKGROUND OF THE INVENTION

This invention relates to a motion-sensitive bird repelling device. More particularly, the invention relates to a device which employs motion detectors, and flexible arms that rotate and makes noise when prompted by the motion detectors, designed for scaring off birds and rodents so as to prevent them from entering a prohibited area.

Each year, people spend their valuable time planting a wide variety of plant seeds in their own private gardens. Unfortunately, birds too often eat the seeds from the garden even before the seeds have a chance to germinate and grow into a plant. This not only causes enormous frustration for the avid gardener who patiently waited for the plant to grow but also causes the gardener to repeat the expensive and troublesome process of replanting the seeds. Thus, it is desirable to have a device that is capable of deterring birds and rodents from entering the garden areas.

Various references uncovered in the prior art provide devices that utilize a jet of water to drive off small animals. For example, U.S. Pat. No. 5,009,192 to Burman discloses an animal deterrent apparatus having water sprinklers which produce sudden jet of water to frighten an animal. Likewise, U.S. Pat. No. 5,603,287 to Houch discloses an animal sensing and repelling system that uses a floodlight and water sprayer for repelling animals. U.S. Pat. No. 5,458,093 to MacMillan discloses another garden protection device comprising a water sprinkler head designed to spray a sudden shock of water over the area to be protected to drive off wandering animals.

In the field of animal repelling device, many have been designed which generate undesirable noises to frighten away animals. For instance, U.S. Pat. No. 5,214,411 to Herbruck discloses an ultrasonic sound emitting apparatus producing an undesirable noise for animals such as dogs and cats to deter such animals from trespassing within certain geographical boundaries. This noise is of such a high frequency that it is not heard by most human beings. Similarly, U.S. Pat. No. 5,450,063 to Peterson discloses a bird avert system which includes microwave, radar, or other signal generation and receiving arrangements for forming an electronic net a distance above a polluted pond, that is triggered by passage therethrough of a bird, to frighten away birds from the pond.

Despite all these animal repelling devices, there is still a further need to provide an improved motion-sensitive bird repelling device. Such a motion-sensitive bird repelling device should be simple in construction so as to minimize manufacturing cost, and yet be capable of deterring birds, rodents, and other small animals from entering a prohibited area by generating noise and fluttering motions. Moreover, such a motion-sensitive bird repelling device should be capable of deterring birds and rodents from entering garden areas without presenting any danger to children and house pets playing nearby.

While these units mentioned above may be suitable for the particular purpose employed, or for general use, they would not be as suitable for the purposes of the present invention as disclosed hereafter.

SUMMARY OF THE INVENTION

It is an object of the invention to provide a motion-sensitive bird repelling device which is simple in construction so as to minimize manufacturing cost, and yet is capable of deterring birds, rodents, and other small animals from entering a prohibited area.

It is another object of the invention to provide a motion-sensitive bird repelling device which is simple to setup.

It is yet another object of the invention to provide a motion-sensitive bird repelling device which is capable of deterring birds and rodents from entering garden areas without presenting any danger to children and house pets playing nearby It is a further object of the invention to provide a motion-sensitive bird repelling device which deters animals from trespassing within certain area by rotating flexible arms that generate noise and fluttering motions.

The invention is a motion-sensitive bird repelling device comprising a cylindrical shaped housing, and a plurality of spike legs extending downwardly from the bottom thereof for securing the housing to a garden or lawn, for protecting newly planted seeds from being eaten by birds and rodents. The bird repelling device includes motion sensors for detecting motion of a bird or rodent entering a prohibited area. The motion sensors activate a motor in response to simultaneous detecting of the trespassing animal into such area. When the motor is activated, a plurality of flexible arms mounted to the motor rotates, producing both noise and fluttering motions for scaring the approaching animals prior to reaching the seeds.

To the accomplishment of the above, and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
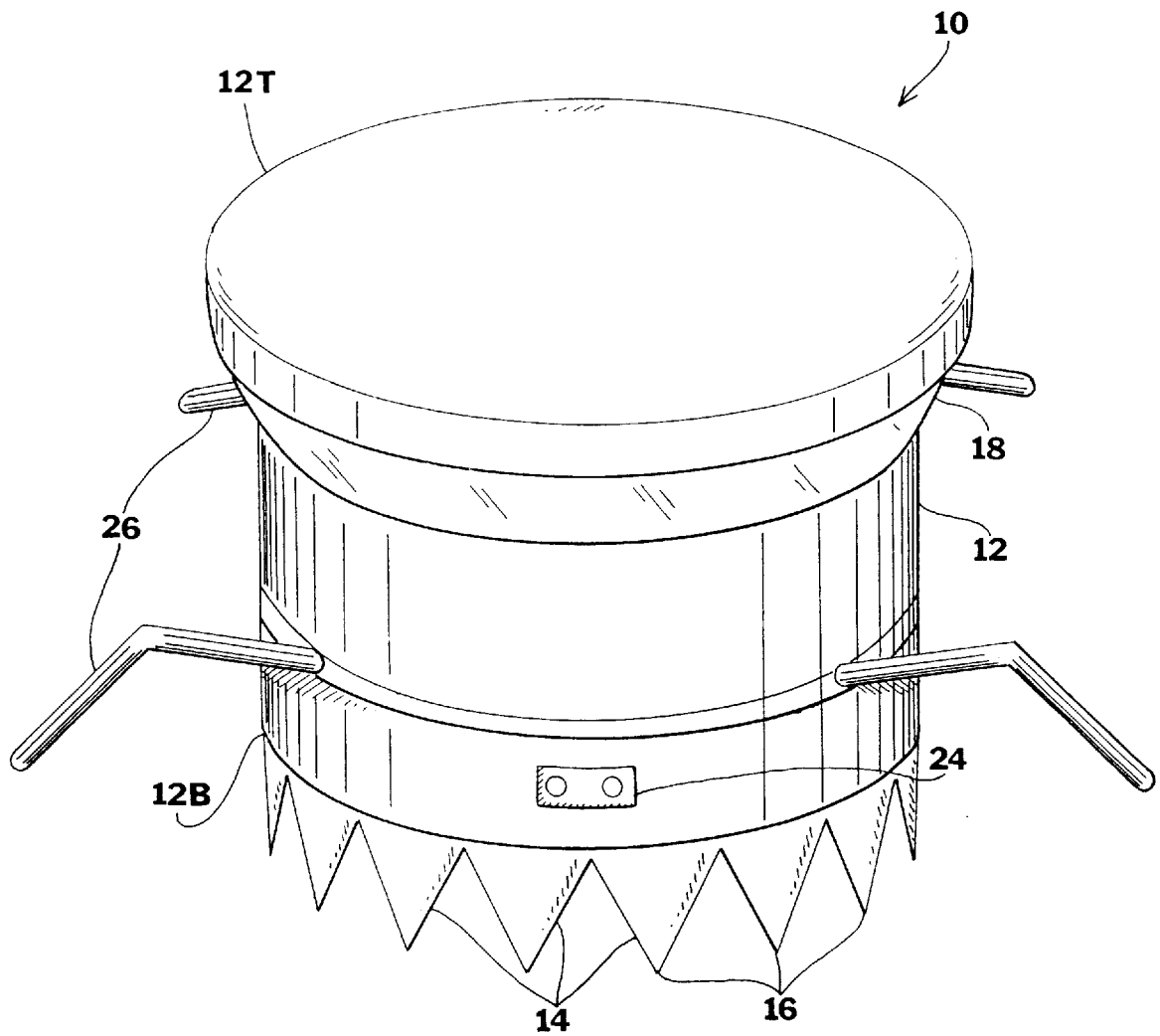
FIG. 1 is a diagrammatic perspective view of the instant invention, illustrating the top portion thereof.
Figure 2:
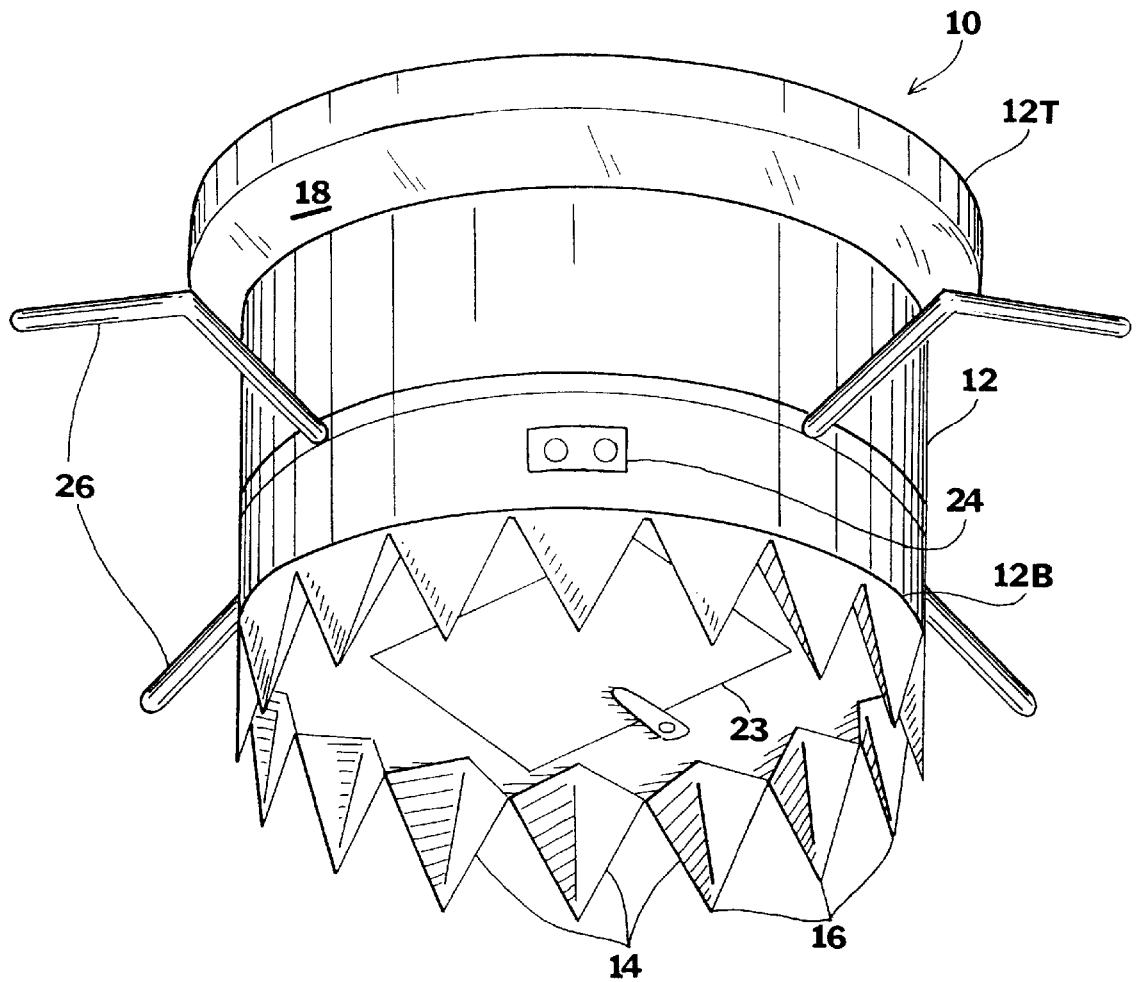
FIG. 2 is a diagrammatic perspective view of the instant invention, illustrating the bottom portion thereof.

FIG. 1 illustrates a motion-sensitive bird repelling device 10 having a cylindrical shaped housing 12 which includes opposite top 12T and bottom 12B portions. The housing 12 is preferably constructed of lightweight material such as plastic. FIG. 2 illustrates a plurality of spike legs 14 extending downwardly from the bottom portion 12B of the housing 12 for securing the housing 12 to the ground of a garden or lawn designed to protect newly planted seeds from being eaten by birds or rodents. Each of the spike legs 14 includes a pointed end 16 for penetrating the ground.

Figure 3:
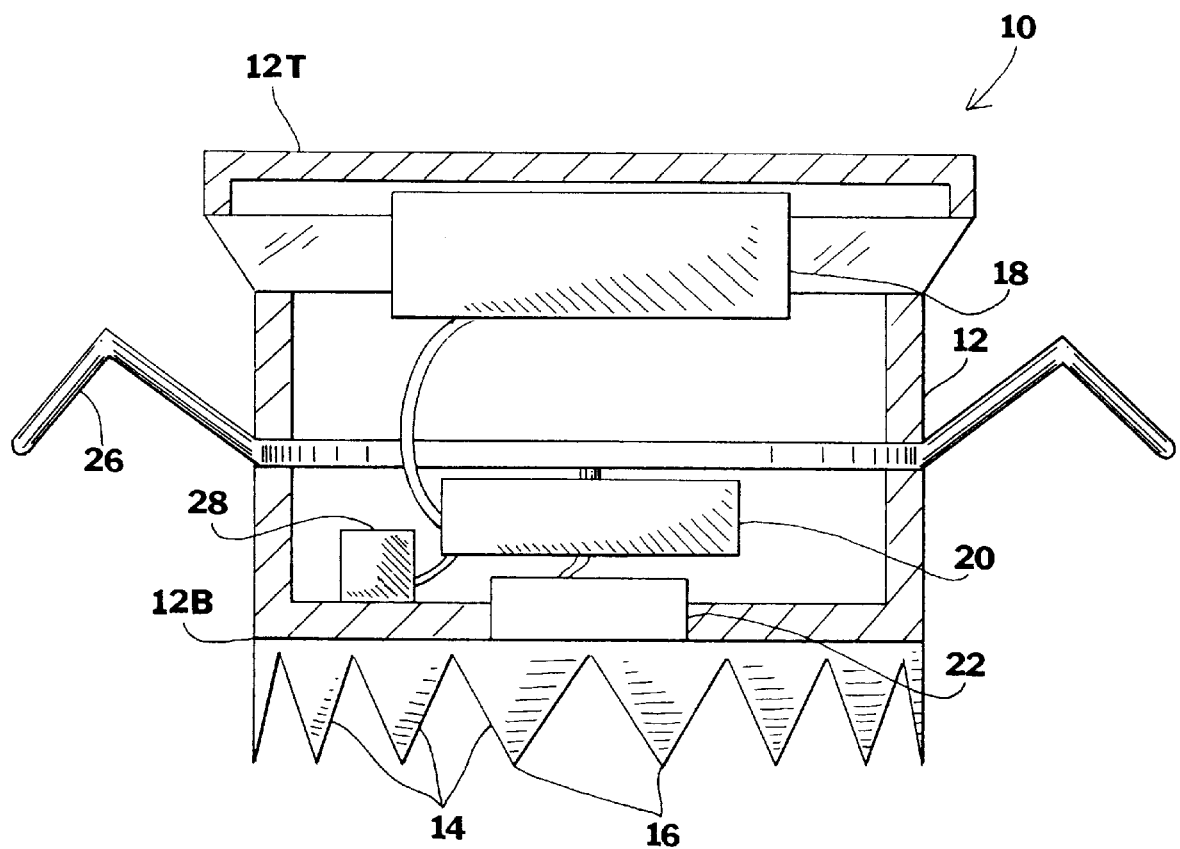
FIG. 3 is a cross-sectional elevational view of the instant invention.

The motion-sensitive bird repelling device 10 includes a plurality of motion sensors 18 mounted within the top portion 12T of the housing 12 for detecting motion of a bird or a rodent entering a prohibited area. FIG. 3 illustrates the motion-sensitive bird repelling device 10 further including an electric motor 20 disposed within the housing 12. The electric motor 20 is electrically connected to a power source 22, and the motion sensors 18 such that the motor 20 is activated in response to the simulataneous detection of an intruding animal by the motion sensors 18.

In an alternative embodiment, the motion-sensitive bird repelling device 10 includes a timer 28 which is operatively coupled to the motor 20 for deactivating the motor 20 after it has been activated for a predetermined amount of time. In addition, the bird repelling device may be provided with a user interface operatively coupled to the timer 28 for selectively setting of the predetermined amount of time the motor 20 is activated after responding to the sensing of the trespassing animal by the motion sensors 18.

The motion-sensitive bird repelling device 10 is adapted to receive a portable power source such as batteries 23 for directing electrical energy to the motion sensors 18 and the motor 20, as shown in drawing FIG. 2. FIGS. 1 and 2 illustrates the motion-sensitive bird repelling device 10 provided with a line connector 24 for connecting to an ordinary 120 volt household outlet for directing electric energy to the motion sensors 18 and the motor 20 when no batteries are present. An operating switch may be provided on the housing 12 for manually activating or deactivating the bird repelling device 10.

FIGS. 1 and 2 illustrate the motion-sensitive bird repelling device 10 further comprises a plurality of flexible arms 26 protruding from the side wall of the housing 12. The flexible arms 26 are rotatably mounted within the housing 12 and are connected to the motor 20 through a series of gears such that when motor 20 is activated, the flexible arms rotates 26, producing both noise and fluttering motions which scare away birds and rodents from freshly seeded gardens and lawns. While the embodiment of the present invention illustrated utilizes the four flexible arms 26 as shown in FIGS. 1 and 2 to scare away birds and rodents, it will be appreciated by those skilled in the art that the motion-sensitive bird repelling device 10 may utilize a motion and noise generating mechanism of any other suitable configuration capable of achieving the desired function.

Many specific details contained in the above description merely illustrate some preferred embodiments and should not be construed as a limitation on the scope of the invention. Many other variations are possible.

What is claimed is:

1. A method of detecting and driving away an intruding animal, with an apparatus comprising power means for supplying power, motion sensor means for detecting motion of said animal, a housing, a motor disposed within said housing, said motor being operatively coupled to said motion sensor and to said power means, and a plurality of flexible arms mounted to said motor, said method comprising steps of:

a) continuously sensing motion while said apparatus is operating;

b) activating said motor upon simultaneous detection of said animal;

c) generating noise and fluttering motions by rotating said flexible arm to scare away said animal; and d) deactivating said motor after a predetermined period of time has passed.

* * * * *